3,389,111
CORONA RESISTANT POLYIMIDE COMPOSITIONS CONTAINING CERTAIN ORGANO - METALLIC COMPOUNDS
James J. McKeown, Mahtomedi, and Charles D. Wright, White Bear Lake, Minn., assignors to Minnesota Mining and Manufacturing Company, St. Paul, Minn.
No Drawing. Filed Jan. 4, 1965, Ser. No. 423,388
30 Claims. (Cl. 260—30.2)

ABSTRACT OF THE DISCLOSURE

Polyimide compositions having improved corona resistance by the addition of certain organo-metallic compounds. The metal portion of the organo-metallic compound is selected from the class of elements of Groups IVb and Vb of the Periodic Table of the elements having atomic numbers from 15 to 83, and iron.

---

The present invention relates to polyimides containing minor amounts of certain organo-metallic compounds. In one aspect, the invention relates to a new class of dielectric compositions. In another aspect, the invention relates to a method for improving the resistance to corona of certain solid dielectric materials. In still another aspect, the invention relates to a novel class of dielectric films.

Polyimides have found increasing use recently as insulating materials in the electrical industries. The high molecular weight polyimides which contain significant amounts of aromaticity have been found to be especially useful as solid electrical insulation materials in locations which are subject to relatively high temperatures for extended periods of time. However, in certain environments in which the dielectric material is subject to high temperatures together with voltages in excess of the corona starting voltage during operation (e.g. in certain electric motor applications), the life of these polymers is limited. In such applications, improvements in resistance to corona is much to be desired.

A specific problem is the resistance to corona of dielectric materials in high voltage applications in which there is a gap over which corona discharges can occur (e.g. greater than about one mil) between the dielectric and the conductor. Under such conditions, the life of dielectric materials is often much shorter than under the same conditions where there is no gap, particularly in the presence of water vapor. Thus, a dielectric which will retain its electrical insulation properties for longer periods of time under such conditions is also to be desired.

It is an object of the present invention to provide a novel class of solid polymeric articles.

It is another object of the present invention to provide a novel and useful class of electrical insulating materials.

It is another object of the present invention to provide a class of dielectric films which are highly useful as electrical insulating materials.

It is another object of the present invention to provide shaped polymeric articles.

It is another object of the invention to provide liquid dispersions which can be formed into useful solid dielectric articles such as films and coverings for conductors such as wires.

It is a further object of the invention to provide certain compositions which have relatively long lives as dielectrics in the presence of corona.

It is a further object of the invention to provide compositions which are highly resistant to repeated corona discharges at high temperatures.

It is a further object of the present invention to provide a method for preparing compositions of improved resistance to corona.

It is a further object of the invention to provide electrical conductors coated with compositions which have relatively long corona lives.

It is a still further object of the invention to provide electrical insulation materials which are useful in applications in which they are subject to high temperatures and voltages for extended periods of time.

Other objects of the invention will become apparent to those skilled in the art upon reading the following specifiation.

In accordance with the above and other objects of the invention, it has been found that compositions having advantageous properties are formed by adding to a polyamic acid a minor amount of an organo-metallic compound of a metal from Group IVb or Vb of the Periodic Chart of the Elements having an atomic number from 15 to 83, inclusive, or of iron in which the metal is bonded directly to carbon in the organic portion of the molecule and converting the polyamic acid to the corresponding polyimide. The Periodic Chart of the elements referred to herein is published inside the back cover of the text Chemistry of Organic Compounds by Carl R. Noller, reprinted August 1952 and published by the W. B. Saunders Company, Philadelphia, Pa. Ordinarily a dispersion (i.e. solution or suspension) of a polyamic acid and an organo-metallic compound in a highly polar solvent is first prepared. This dispersion can then be stored or converted immediately into its final form which may be an unsupported film, a coating on an electrical conductor such as a wire, a shaped solid article, etc.

There can be one or more metal atoms in the molecule, usually not more than two. There will be a maximum of five full bonds or the equivalent thereof between any metal atom and carbon atoms in the organic groups, preferably from two to four such bonds. In most cases these are full bonds between one carbon atom and one metal atom. In some cases, however, the bonds are shared by more than one carbon atom. Thus in ferrocene the equivalent of two full bonds with a single metal atom are shared equally by ten carbon atoms (pi bonding). The organic group or groups can be aromatic, aliphatic or aralipathic. The metal atom can have one or more (usually not more than 2) electronegative groups covalently or ionically bonded to it in the organo-metallic compound although this is not necessary. Such electronegative groups include oxide, halide, sulfide, hydroxide, etc.

Preferably, the organo-metallic compound is added in the amount of from about 0.1 to 20 percent by weight of the cured polymer. Lesser amounts of the additive are insufficient to have a desired effect and greater amounts thereof are unnecessary. Ordinarily, from about 1 to 10 percent of additive (based on the weight of the cured polymer) is utilized, this being the more preferred range.

Polyimides useful in the practice of the present invention can be prepared by reacting a diamine having a divalent group containing at least two carbon atoms with a tetracarboxylic acid dianhydride containing a tetravalent group containing at least 2 carbon atoms, with no more than 2 carbonyl groups of the dianhydride radical being attached to any one carbon atom of the tetravalent group, whereby a polyamide (polyamic) acid composition is formed which is then converted to the polyimide by chemical or heat treatment. The reaction is indicated by the following equation which shows a repeating unit of the polyamic acid being converted to a repeating unit of the polyimide:

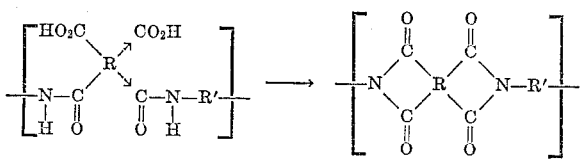

R in this equation is the tetravalent group of the dianhydride, R' is the divalent group of the diamine and → indicates isomerism.

The polyamic acids normally have an inherent viscosity of at least 0.1 and preferably from 0.3 to 5.0. They can be prepared by the reaction of the diamine and the dianhydride in a highly polar organic solvent under substantially anhydrous conditions while maintaining the temperature throughout the reaction below 60° C., preferably below 50° C. To this dispersion is added the organo-metallic compound. Useful highly polar organic solvents include dimethyl formamide, dimethyl acetamide and N-methyl pyrrolidone as well as highly polar solvent mixtures (e.g. of dimethyl acetamide, N-methyl pyrrolidone and toluene). Normally the dispersed polyamic acid and organo-metallic compound are in solution although this is not necessary.

The dispersion of the polymeric composition, preferably containing at least 50 percent polyamic acid in the organic polar solvent and the organo-metallic compound, may be used as such for forming shaped structures. Reference is made to South African Patent No. 60/1040 with respect to the polymer.

Preferably the tetracarboxylic acid dianhydride radicals contain a tetravalent group containing at least 6 carbon atoms and having benzenoid unsaturation, each of the 4 carbonyl groups of the dianhydride radical being attached to a separate carbon atom in the tetravalent group, the carbonyl groups being in pairs in which the groups in each pair are attached to adjacent carbon atoms of the tetravalent group. Another useful class of dianhydride are those containing heterocyclic rings. Illustrative of dianhydrides suitable for use in the present invention are:

pyromellitic dianhydride;
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
2,2-bis(3,4-dicarboxyphenyl)propane dianhydride;
bis(3,4-dicarboxyphenyl)sulfone dianhydride;
perylene 3,4,9,10-tetracarboxylic acid dianhydride;
3,3',4,4'-tetracarboxy benzophenone dianhydride;
bis(3,4-dicarboxyphenyl)ether dianhydride;
bis(3,4-dicarboxyphenyl)sulfone dianhydride;
ethylene tetracarboxylic acid dianhydride; and
pyridine tetracarboxylic acid dianhydride.

The organic diamines useful in preparing the polyimides have the structural formula $H_2N—R'—NH_2$, wherein R', a divalent radical containing at least 2 carbon atoms, may be aromatic, heterocyclic, aliphatic, cycloaliphatic, or a combination thereof. These groups can also be substituted with halo, R"—, R"O—, R"S— and the like groups, wherein R" is hydrocarbon containing up to six carbon atoms. The most useful diamines are the primary diamines which, upon reaction with a dianhydride, provide the polyamide-acids which are converted into the polyimides. The preferred R' groups in the diamines contain benzenoid unsaturation. Among the diamines which are suitable for use in the present invention are:

4,4'-diaminodiphenyl methane;
benzidine;
5-amino-2-(p-aminophenyl)benzthiazole;
4-amino-2-(p-aminophenyl)benzthiazole;
5-amino-2-(m-aminophenyl)benzthiazole;
4-amino-2-(m-aminophenyl)benzthiazole;
5-amino-2-(p-aminophenyl)benzoxazole;
4-amino-2-(p-aminophenyl)benzoxazole;
5-amino-2-(m-aminophenyl)benzoxazole;
4-amino-2-(m-aminophenyl)benzoxazole;
2,5-diamino benzoxazole;
2,5-diamino benzthiazole;
3,3'-dichloro-benzidine;
4,4'-diamino-diphenyl sulfide;
3,3'-diamino-diphenyl sulfone;
4,4'-diamino-diphenyl sulfone;
4,4'-diamino-diphenyl ether;
1,5-diamino naphthalene;
meta phenylenediamine;
paraphenylenediamine;
3,3'-dimethyl-4,4'-biphenyl diamine;
3,3'-dimethoxy benzidine;
2,4-bis(beta-amino-t-butyl)toluene;
bis(para-beta-amino-t-butyl-phenyl)ether;
bis-(para-beta-methyl-delta-amino-pentyl)benzene;
bis-para-(1,1-dimethyl-5-amino-pentyl)benzene;
1-isopropyl-2,4-metaphenylene diamine;
m-xylylene diamine;
p-xylylene diamine;
di(para-amino-cyclohexyl)methane;
hexamethylene diamine;
hepta-methylene diamine;
octamethylene diamine;
nona-methylene diamine,
decamethylene diamine;
diamino-propyltetramethylene-diamine;
3-methyl-heptamethylene diamine;
4,4-dimethylheptamethylene diamine;
2,11-diamino-dodecane;
1,2-bis-(3-amino-propoxy ethane);
2,2-dimethyl propylene diamine;
3-methoxy-hexamethylene diamine;
2,5-dimethylhexamethylene diamine;
2,5-dimethylheptamethylene-diamine;
3-methylheptamethylene diamine;
5-methylnonamethylene-diamine;
2,17-diamino-eicosadecane;
1,4-diamino-cyclohexane;
1,10-diamino-1,10-dimethyl decane;
1,12-diamino-octadecane;
$H_2N(CH_2)_3O(CH_2)_2O(CH_2)_3NH_2$;
$H_2N(CH_2)_3S(CH_2)_3NH_2$;
$H_2N(CH_2)_3N(CH_3)(CH_2)_3NH_2$;

Among the organo-metallic compounds which can be used in the practice of the invention are aryl and/or alkyl germanium compounds such as triphenyl germane; aryl and/or alkyl tin compounds such as tetraphenyl tin, bis tributyl tin oxide, tributyl tin chloride and dibutyl tin dichloride; aryl and/or alkyl lead compounds such as tetraphenyl lead; aryl and/or alkyl phosphorous compounds such as triphenyl phosphorous; aryl and/or alkyl arsenic compounds such as triphenyl arsenic oxide; aryl and/or alkyl antimony compounds such as triphenyl antimony dichloride; aryl and/or alkyl bismuth compounds such as trinaphthyl bismuth; bicyclo pentadienyl iron (ferrocene) and derivatives thereof such as acetyl ferrocene; etc.

The following examples are offered to furnish a better understanding of the present invention, and are not to be construed as in any way limiting thereof. While the examples are limited in the polyimides and organo-metallic compounds utilized, it should be understood that other materials of the previously defined types can be treated in essentially analogous manners. All parts are by weight unless otherwise specifically indicated. The word "mil" herein indicates .001 inch.

A number of polyimide films containing various organo-metallic compounds are prepared as follows: A 15 percent solution of polyamic acid is prepared by reacting substantially equimolar amounts of purified pyromellitic dianhydride (PMDA) and oxydianiline, i.e. 4,4'-diamino diphenyl ether (ODA) in dry dimethyl-acetamide. The polymer has an inherent viscosity of about 1.8 (measured at 0.5 percent concentration in dimethylacetamide). The organo-metallic compound is then added with mixing to this solution in an amount sufficient to constitute the desired percent by weight of the polymer after removal of solvent and conversion to polyimide film. The resulting dispersion (which can be either a solution or a suspension) is degassed at 25° C. and about 1 mm. of mercury pressure if necessary. The identity and the amount of additive in each example is given in Table I.

TABLE I

| Example No.: | Additive |
|---|---|
| 1 | 2% triphenyl phosphorous. |
| 2 | 5% triphenyl phosphorous. |
| 3 | 2% triphenyl bismuth. |
| 4–6 | 5% triphenyl antimony. |
| 7–10 | 3% ferrocene. |
| 11–13 | 5% ferrocene. |
| 14 | 5% tetraphenyl lead. |
| 15 | 5% triphenyl arsenic. |
| 16 | 5% triphenyl germane. |
| 17 | 5% tetrabutyl tin. |
| 18 | 5% triphenyl tin chloride. |

A 40 mil uniform layer of the polyamic acid solution is placed on a clean Pyrex glass sheet. The coated glass sheet is heated in an air circulating oven for 1 hour at 100° C., 1 hour at 200° C. and 1 hour at 300° C. The resulting film is tough, strong and flexible.

Corona life tests of the compositions of the invention and the controls are run on these films utilizing the following procedure: The sample to be tested (in film form) is laid upon a grounded flat copper plate. The high voltage electrode (a ¼" by ½" rectangular plate of transformer core iron) is placed on top of the test film. The copper plate and the film being tested both extend beyond the periphery of the high voltage electrode on all sides. The corona discharges occur largely from the edges of the high voltage electrode to the test film. Five replicate tests are run on each film. The tests are run at 1,042 cycles per second (c.p.s.) and at various temperatures (25° C., 60° C., 98° C., and 132° C.). The effect of the relative humidity on the tests run at 25° C. is eliminated by running those tests at 0 percent relative humidity. At the higher test temperatures, the effect of the humidity is negligible and those tests are therefore run at ambient relative humidity. The test time to failure of the first (low), third (medium) and last (high) sample of each replicate set is recorded. The test time of the third sample to fail is then reduced to equivalent 60 cycles per second by multiplying by 17.4 (1,042/60). The results obtained are as follows:

TABLE II

| Example Number | Temp., °C. | Thickness (Mils) | Voltage, Volts | Stress, Volts/Mil | Corona Life Time to Failure (hours) Measured | | | Equiv. 60 c.p.s., Median |
|---|---|---|---|---|---|---|---|---|
| | | | | | Low | Median | High | |
| 1 | 25 | 4.2 | 1,500 | 358 | 9.1 | 9.4 | 12.6 | 164 |
| 2 | 25 | 6.0 | 1,500 | 250 | 54.8 | 59.7 | 94.0 | 1,040 |
| 3 | 25 | 4.4 | 1,500 | 340 | 7.1 | 12.8 | 16.0 | 223 |
| 4 | 25 | 3.5 | 1,500 | 428 | 4.8 | 11.6 | 28.5 | 202 |
| 5 | 60 | 4.5 | 1,500 | 333 | 9.6 | 12.7 | 13.9 | 222 |
| 6 | 132 | 5.4 | 1,500 | 278 | 6.6 | 8.1 | 11.9 | 141 |
| 7 | 25 | 5.0 | 1,500 | 300 | 20.1 | 25.2 | 57.0 | 440 |
| 8 | 60 | 5.0 | 1,500 | 300 | 13.0 | 28.0 | 31.9 | 488 |
| 9 | 132 | 5.0 | 1,500 | 300 | 12.6 | 16.6 | 25.3 | 290 |
| 10 | 132 | 25 | 5,000 | 200 | 38.3 | 45.0 | 58.3 | 785 |
| 11 | 25 | 4.3 | 1,500 | 350 | 1.5 | 22 | 90 | 384 |
| 12 | 98 | 3.5 | 1,500 | 430 | 3.0 | 8.6 | 27.9 | 150 |
| 13 | 132 | 4.7 | 1,500 | 320 | 6.1 | 18.4 | 38.2 | 322 |
| 14 | 132 | 4.8 | 1,500 | 314 | 5.6 | 57.1 | 58.9 | 992 |
| 15 | 132 | 5.0 | 1,500 | 300 | 1.1 | 26.0 | 29.0 | 453 |
| 16 | 132 | 5.0 | 1,500 | 300 | 6.1 | 12.0 | 15.7 | 209 |
| 17 | 132 | 4.0 | 1,500 | 375 | 0.2 | 5.5 | 36.1 | 96 |
| 18 | 132 | 5.0 | 1,500 | 300 | 4.8 | 5.5 | | 96 |

The effect of the additives upon the corona life of the polyimide of PMDA and ODA is shown in Table III by comparing the corona life of each sample of Table II with the corona life of a control lot. The control values are obtained from tests of polyimide films comparable to the films of the examples but containing no additive.

TABLE III

| Example Number | Additive | Corona Life Equiv., 60 c.p.s. (hrs.) | | Increase in Corona Life Due to Additive, percent |
|---|---|---|---|---|
| | | Polyimide without Additive | Polyimide with Additive [1] | |
| 1 | 2% φ₃P | 135 | 164 | 21 |
| 2 | 5% φ₃P | 365 | 1,040 | 185 |
| 3 | 2% φ₃Bi | 145 | 223 | 54 |
| 4 | 5% φ₃Sb | 94 | 202 | 115 |
| 5 | 5% φ₃Sb | 81 | 222 | 174 |
| 6 | 5% φ₃Sb | 88 | 141 | 60 |
| 7 | 3% Ferrocene | 206 | 440 | 114 |
| 8 | do | 120 | 488 | 307 |
| 9 | do | 64 | 290 | 353 |
| 10 | do | 210 | 785 | 274 |
| 11 | 5% Ferrocene | 137 | 384 | 180 |
| 12 | do | 17 | 150 | 783 |
| 13 | do | 46 | 322 | 600 |
| 14 | 5% φ₄Pb | 51 | 992 | 1,845 |
| 15 | 5% φ₃As | 64 | 453 | 608 |
| 16 | 5% φ₃GeH | 64 | 209 | 226 |
| 17 | 5% Bu₄Sn | 24 | 96 | 300 |
| 18 | 5% φ₃SnCl | 64 | 96 | 50 |

[1] Median value from Table I.

Example 19

A test film comparable to that of Example 4 above is prepared using a mixture of about 40 parts of dimethyl acetamide, 40 parts of N-methyl pyrrolidone and 20 parts of toluene as the solvent for the polyamic acid and the triphenyl antimony. When this film is tested in the same way as the film of Example 4, a median corona life (equivalent 60 cycles per second) of about 200 hours at 25° C. and a stress of about 430 volts/mil is obtained.

Example 20

A film which is the same as those of Examples 4–6 except that it is 4.6 mils in thickness and a control film (containing no triphenyl antimony) are prepared. They are tested at 132° C. and 1500 volts in the manner of the previous examples except that the high voltage electrode is a needle point and a gap of 5 mils is left between the high voltage electrode and the sample during testing. The results are as follows:

TABLE IV

| Lot | Additive | Thickness (mils) | Stress (Volts/Mil) | Corona Life Time to Failure (hours) Measured— | | | Equiv., 60 c.p.s. Median |
|---|---|---|---|---|---|---|---|
| | | | | Low | Median | High | |
| A | None | 4.8 | 314 | 2.3 | 14.2 | 14.2 | 247 |
| B | 5% φ₃Sb | 4.6 | 326 | 19.4 | 51.3 | 108.1 | 892 |

Thus even at a slightly higher stress, the polymer containing the organo-metallic additive shows an improvement of 261% in corona life over the control. At comparable stress the improvement would be about 330–340%. This exemplifies the substantial improvement in corona life of polyimides in environments in which there is a gap between the dielectric and at least one electrode which is affected by the addition thereto of the organo-metallic compounds.

Similar improvements in corona life are realized in tests of films of the same polyimide containing 1 percent of ferrocene and 10 percent of tetrabutyl tin.

In Table V a number of examples of compositions of the invention comprising a number of different polyimides containing triphenyl antimony are shown. They are prepared as follows: Dispersions of the various polyamic acids in dry dimethylacetamide containing 5 percent triphenyl antimony (based on the weight of the cured polyimide) are prepared using essentially equimolar amounts of the diamines and dianhydrides in Table V and using the procedure of Examples 1–18. Test films are then prepared from these dispersions by the procedure of Examples 1–18. In some cases, however, the polyamic acid is treated with an equimolar amount of 1 part each of acetic anhydride and pyridine before heating.

TABLE V

| Ex. No. | Dianhydride | Diamine |
|---|---|---|
| 21 | PMDA | 4,4'-diaminodiphenylmethane. |
| 22 | PMDA | 4,4'-diaminodiphenylsulfone. |
| 23 | PMDA | 1,3-diaminobenzene. |
| 24 | PMDA | 1,6-diaminohexane. |
| 25 | Benzophenone tetracarboxylic acid dianhydride (BPTCA). | ODA. |
| 26 | do | 4,4'-diaminodiphenylsulfone. |
| 27 | do | 4,4'-diaminodiphenylmethane. |
| 28 | do | 1,3-diaminobenzene. |
| 29 | do | 1,6-diaminohexane. |
| 30 | PMDA:BPTCA (1:1 mole ratio). | ODA. |
| 31 | do | 1,3-diaminobenzene. |
| 32 | BPTCA | ODA:4,4'-diaminodiphenylmethane (1:1 mole ratio). |
| 33 | naphthalene tetracarboxylic dianhydride | ODA. |
| 34 | BPTCA | p-Phenylene diamine. |
| 35 | BPTCA | 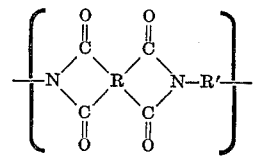 |
| 36 | BPTCA | 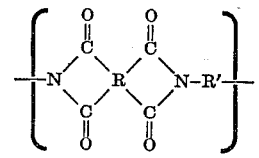 |

These films, when tested in the manner of Examples 1–18, exhibit similar valuable increases in corona life compared to films of the polyimides without the organo-metallic additive.

Lengths of copper wire are coated with the polyamic acid dispersions containing the organo-metallic compound of Examples 21–36 and the coatings are cured to form solid polyimide coatings about 5 mils in thickness. These all form tough and adherent coatings which have considerably longer corona lives under comparable conditions than the respective polyimides containing no organo-metallic additives.

What is claimed is:

1. A solid composition of a major proportion of a polyimide and from about 0.1 to 20 percent by weight of an organo-metallic compound based on the weight of the polyimide; the polyimide having the repeating unit $$\left[\begin{array}{c} \underset{\underset{O}{\overset{\overset{O}{\|}}{C}}}{\overset{\overset{O}{\|}}{C}} \\ -N \diagdown \underset{\underset{C}{\overset{C}{\diagup}}}{\overset{R}{}} \diagdown N-R'- \\ \underset{O}{\overset{\|}{O}} \quad \underset{O}{\overset{\|}{O}} \end{array}\right]$$

wherein R is a tetravalent group containing at least 2 carbon atoms, with no more than 2 carbonyl groups attached to any one carbon atom thereof and R' is a divalent group containing at least two carbon atoms and having been prepared from a polyamic acid having an inherent viscosity of at least 0.1; the organo-metallic compound being an aromatic, aliphatic or araliphatic compound of a metal selected from the class of elements of Groups IVb and Vb of the Periodic Table of the elements having atomic numbers from 15 to 83 inclusive and iron, said metal being bonded through carbon to the organic portion of the molecule.

2. A composition according to claim 1 wherein the organo-metallic compound is a compound of a metal of Group IVb of the Periodic Table of the elements.

3. A composition according to claim 1 wherein the organo-metallic compound is a compound of a metal of Group Vb of the Periodic Table of the elements.

4. A composition according to claim 1 wherein the organo-metallic compound is a compound of iron.

5. A composition according to claim 1 comprising a polyimide having the repeating unit $$\left[\begin{array}{c} \underset{\underset{O}{\overset{\overset{O}{\|}}{C}}}{\overset{\overset{O}{\|}}{C}} \\ -N \diagdown \underset{\underset{C}{\overset{C}{\diagup}}}{\overset{R}{}} \diagdown N-R'- \\ \underset{O}{\overset{\|}{O}} \quad \underset{O}{\overset{\|}{O}} \end{array}\right]$$

wherein R and R' each contain benzenoid unsaturation.

6. A composition according to claim 5 wherein the polyimide is a reaction product of an anhydride containing benzenoid unsaturation and oxydianiline.

7. A composition according to claim 5 wherein the polyimide is a reaction product of an anhydride containing benzenoid unsaturation and diamino diphenyl methane.

8. A composition according to claim 5 wherein the polyimide is a reaction product of an amine containing benzenoid unsaturation and pyromellitic dianhydride.

9. A composition according to claim 5 wherein the polyimide is a reaction product of an amine containing benzenoid unsaturation and benzophenone tetracarboxylic acid dianhydride.

10. A composition according to claim 9 wherein the polyimide is a reaction product of benzophenone tetracarboxylic acid anhydride and p-phenylenediamine.

11. A composition according to claim 9 wherein the polyimide is a reaction product of benzophenone tetracarboxylic acid anhydride and oxydianiline.

12. A dispersion in a polar organic solvent of a major proportion of a polyamic acid having an inherent viscosity of at least 0.1 and from about 0.1 to 20 percent by weight of the polyamic acid of an organic aromatic, aliphatic or araliphatic compound of a metal selected from the class of Groups IVb and Vb of the Periodic Table of the elements having atomic numbers from 15 to 83 inclusive and iron in which the metal is bonded through carbon to the organic portion of the molecule, the polyamic acid having the repeating unit

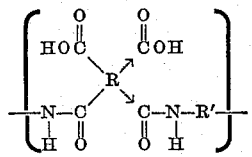

wherein R is a tetravalent group containing at least 2 carbon atoms, with no more than 2 carbonyl groups attached to any one carbon atom thereof, R' is a divalent group containing at least two carbon atoms and → indicates isomerism.

13. A dispersion according to claim 12 wherein the polar organic solvent is dimethyl-acetamide.

14. A dispersion according to claim 12 wherein the organo-metallic compound is a compound of a metal of Group IVb of the Periodic Table of the elements.

15. A dispersion according to claim 12 wherein the organo-metallic compound is a compound of a metal of Group Vb of the Periodic Table of the elements.

16. A dispersion according to claim 12 wherein the organo-metallic compound is a compound of iron.

17. A dispersion according to claim 12 of a polyamic acid having the repeating unit

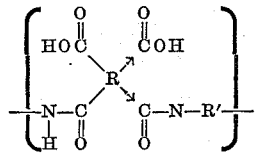

wherein R and R' each contain benzeoid unsaturation.

18. A dispersion according to claim 17 wherein the polyamic acid is a reaction product of an anhydride containing benzenoid unsaturation and oxydianiline.

19. A dispersion according to claim 17 wherein the polyamic acid is a reaction product of an amine containing benzenoid unsaturation and pyromellitic dianhydride.

20. A solution in a mixture of dimethyl acetamide, N-methyl pyrrolidone and toluene of a polyamic acid of pyromellitic dianhydride and oxydianiline having an inherent viscosity of at least 0.1 and from about 0.1 to 20 percent by weight of the polyamic acid of an organic aromatic, aliphatic or araliphatic compound of a metal selected from the class of Groups IVb and Vb of the Periodic Table of the elements having atomic numbers from 15 to 83 inclusive and iron in which the metal is bonded through carbon to the organic portion of the molecule.

21. A dielectric film containing as the essential film-forming ingredient a polyimide and from about 0.1 to 20 percent by weight of an organo-metallic compound based on the weight of the polyimide; the polyimide having the repeating unit

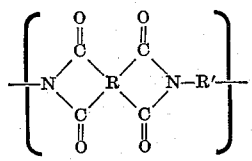

wherein R is a tetravalent group containing at least 2 carbon atoms, with no more than 2 carbonyl groups attached to any one carbon atom thereof and R' is a divalent group containing at least two carbon atoms and having been prepared from a polyamic acid having an inherent viscosity of at least 0.1; the organo-metallic compound being an aromatic, aliphatic or araliphatic compound of a metal selected from the class of Groups IVb and Vb of the Periodic Table of the elements having atomic numbers from 15 to 83 inclusive and iron in which the metal is bonded through carbon to the organic portion of the molecule.

22. A dielectric film according to claim 21 wherein the polyimide has the repeating unit

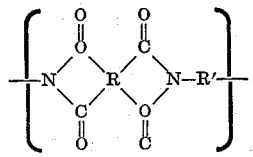

wherein R and R' each contain benzenoid unsaturation.

23. A dielectric film containing as the essential film-forming ingredient a polyimide of pyromellitic dianhydride and oxydianiline prepared from a polyamic acid having an inherent viscosity of at least 0.1 containing from about 0.1 to 20 percent by weight of the polyimide of an organic aromatic, aliphatic or araliphatic compound of a metal selected from the class of Groups IVb and Vb of the Periodic Table of the elements having atomic numbers from 15 to 83 inclusive and iron in which the metal is bonded through carbon to the organic portion of the molecule.

24. An electrical conductor coated with a composition of a major proportion of a polyimide containing from about 0.1 to 20 percent by weight of an organo-metallic compound based on the weight of the polyimide; the polyimide having the repeating unit

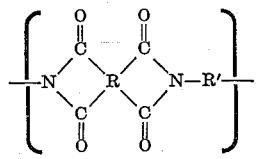

wherein R is a tetravalent group containing at least 2 carbon atoms, with no more than 2 carbonyl groups attached to any one carbon atom thereof and R' is a divalent group containing at least two carbon atoms and having been prepared from a polyamic acid having an inherent viscosity of at least 0.1; the organo-metallic compound being an aromatic, aliphatic or araliphatic compound of a metal selected from the class of Groups IVb and Vb of the Periodic Table of the elements having atomic numbers from 15 to 83 inclusive and iron in which the metal is bonded through carbon to the inorganic portion of the molecule.

25. A coated electrical conductor according to claim 24 wherein the polyimide has the repeating unit

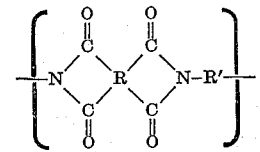

wherein R and R' each contain benzenoid unsaturation.

26. An electrical conductor coated with a composition of a major proportion of a polyimide of pyromellitic dianhydride and oxydianiline prepared from a polyamic acid having an inherent viscosity of at least 0.1 containing from about 0.1 to 20 percent by weight of the polyimide of an organic aromatic, aliphatic or araliphatic compound of a metal selected from the class of Groups IVb and Vb of the Periodic Table of the elements having atomic numbers from 15 to 83 inclusive and iron in which the metal is bonded through carbon to the organic portion of the molecule.

27. A composition according to claim 1 wherein there is an electronegative group bonded to the metal in the organo-metallic compound.

28. A composition according to claim 27 wherein the organo-metallic compound is triphenyltin chloride.

29. A solid composition of a major proportion of a polyimide of pyromellitic dianhydride and oxydianiline prepared from a polyamic acid having an inherent viscosity of at least 0.1 and from about 0.1 to 20 percent by weight of the polyimide of an organic aromatic, aliphatic or araliphatic compound of a metal selected from the class of elements of Groups IV$b$ and V$b$ of Periodic Table of the elements having atomic numbers from 15 to 83 inclusive and iron, said metal being bonded through carbon to the organic portion of the molecule.

30. A dispersion in a polar organic solvent of a major proportion of a polyamic acid of pyromellitic dianhydride and oxydianiline having an inherent viscosity of at least 0.1 and from about 0.1 to 20 percent by weight of the polyamic acid of an organic aromatic, aliphatic or araliphatic compound of a metal selected from the class of Groups IV$b$ and V$b$ of the Periodic Table of the elements having atomic numbers from 15 to 83 inclusive and iron in which the metal is bonded through carbon to the organic portion of the molecule.

References Cited

UNITED STATES PATENTS

| | | | |
|---|---|---|---|
| 3,073,785 | 1/1963 | Angelo | 260—78 |
| 3,179,634 | 4/1965 | Edwards | 260—78 |

MORRIS LIEBMAN, *Primary Examiner.*

B. A. AMERNICK, *Assistant Examiner.*

UNITED STATES PATENT OFFICE
CERTIFICATE OF CORRECTION

Patent No. 3,389,111 June 18, 1968

James J. McKeown et al.

It is certified that error appears in the above identified patent and that said Letters Patent are hereby corrected as shown below:

Column 3, line 19, and column 9, line 21, "⟶", each occurrence, should read -- ---⟩--. Column 4, line 48, after "5-methylnonamethylene-diamine;" insert -- 2,11-diamino-dodecane; --. Column 6, line 4, "medium" should read -- median --; line 7, "obtainet" should read -- obtained --. Column 10, lines 11 to 17, the formula should appear as shown below:

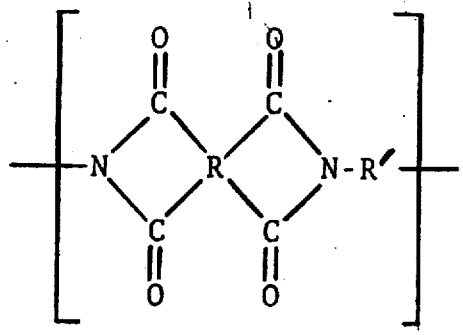

Signed and sealed this 10th day of February 1970.

(SEAL)
Attest:

EDWARD M. FLETCHER, JR.
Attesting Officer

WILLIAM E. SCHUYLER, JR.
Commissioner of Patents